Oct. 6, 1970   R. W. JOHNSON   3,532,397
ROLLER HEIGHT ADJUSTMENT FOR ENDLESS TRACK TRACTORS
Filed Jan. 6, 1969   2 Sheets-Sheet 1
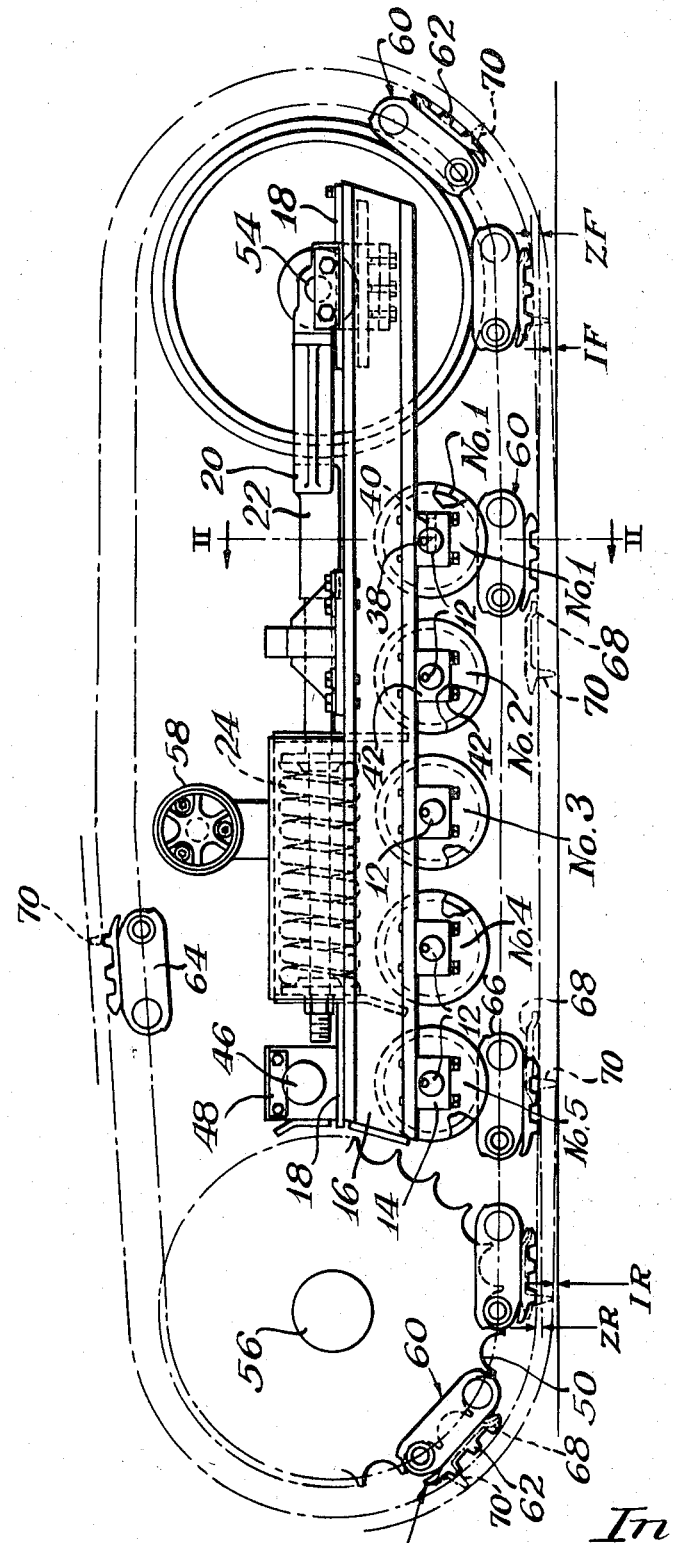

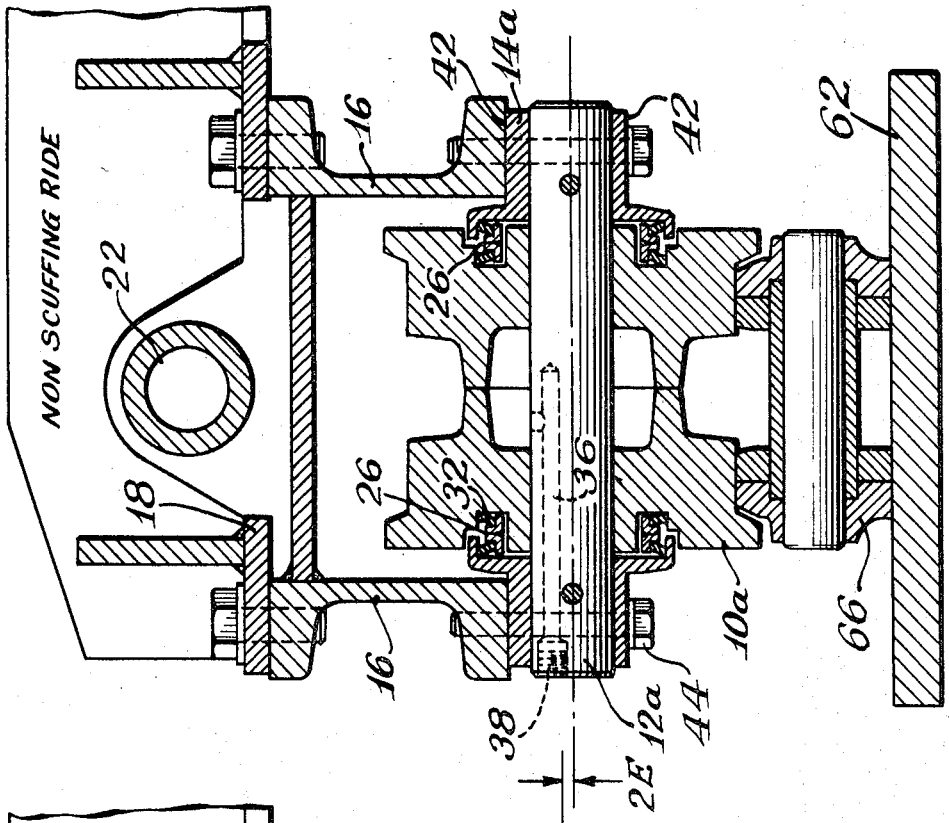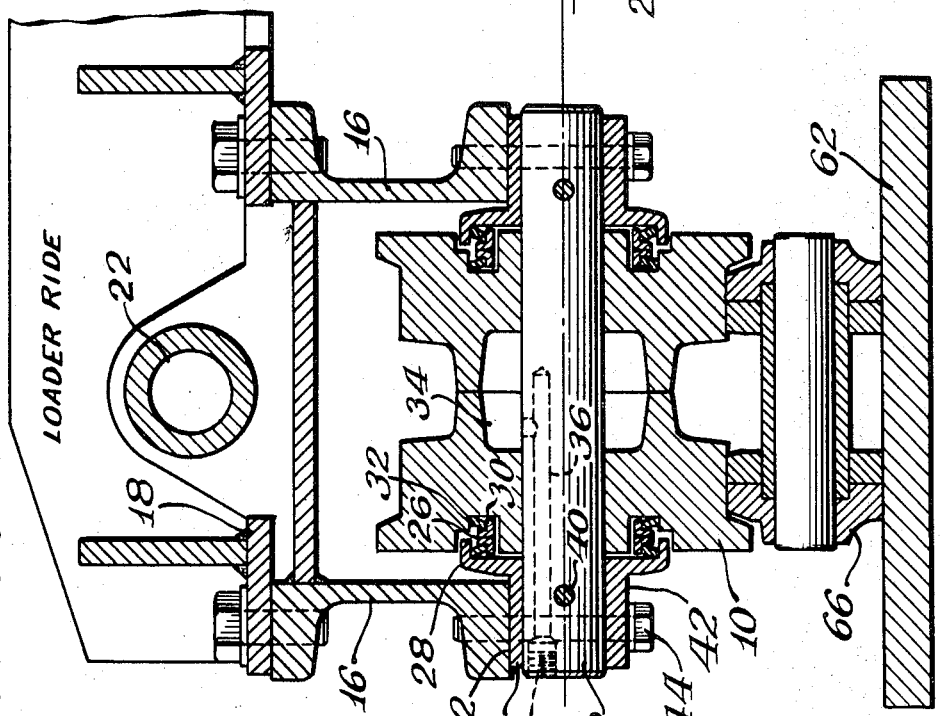

United States Patent Office 3,532,397
Patented Oct. 6, 1970

3,532,397
ROLLER HEIGHT ADJUSTMENT FOR ENDLESS TRACK TRACTORS
Robert W. Johnson, Winfield, Ill., assignor to International Harvester Company, Chicago, Ill., a corporation of Delaware
Filed Jan. 6, 1969, Ser. No. 789,271
Int. Cl. B62d 55/14
U.S. Cl. 305—11                      1 Claim

ABSTRACT OF THE DISCLOSURE

Endless track structure for crawler tractors, having track rollers across the bottom of which a lower flight of the track is trained, and having adjustment means supporting the rollers for height adjustment. The adjustment means supporting the rollers comprises a track frame, roller shaft individual to the rollers, and blocks connected to the frame on opposite sides of the rollers and bored for and receiving the roller shafts, the block bores each being eccentrically positioned with respect to the top and bottom of its respective block to vertically shift the plane of the bottoms of the rack roller when the blocks are collectively reversed top for bottom.

---

This invention relates to a track roller height adjustment for crawler vehicles, including but not limited to track type tractors. The adjustment does not necessitate additional parts such as shim means, which have sometimes been required in the mechanical arts whereby a mechanism has been shimmed to any particular height desired with respect to a supporting member.

Various features, objects, and advantages will either be specifically pointed out or become apparent when, for a better understanding of the invention, reference is made to the following description taken in conjunction with the accompanying drawings, which show a preferred embodiment thereof and in which:

FIG. 1 is a right side elevational view of the roller carrying track frame of a crawler tractor embodying the present invention;

FIG. 2 is a front elevational view in cross section taken along the line II—II of FIG. 1 to show the roller-raise adjustment; and FIG. 3 is like FIG. 2, but is fragmentary and shows the roller-lower adjustment.

More particularly in FIG. 1 of the drawings, a crawler tractor generally indicated at 7 has, at the sides, respective left and right track type wheel suspensions 8 and 9 which extend fore and aft in vertical planes parallel to the longitudinal center line of the tractor. The respective suspensions include sets of longitudinally disposed track rollers 10 which, beginning at their forwardmost location on the tractor, comprise No. 1 left and right rollers, No. 2 left and right rollers, No. 3 left and right rollers, No. 4 left and right rollers, and No. 5 left and right rollers 10. The track rollers 10 are rotatably carried on a portion of individual, transversely disposed, rotatably fast axle shafts 12 intermediate the shaft ends, and each shaft 12 is fixed in two shaft attachment blocks 14 disposed one at each of such ends.

Each wheel suspension includes two, channel shaped, longitudinally extending supporting beams 16 fixed in a track frame 18, and a front idler fork 20 which is longitudinally shiftable with respect to the beams in the track frame 18. Rearward shift of the fork 20 is resisted hydraulically and mechanically by an hydraulic track adjuster mechanism 22 and by a recoil spring mechanism 24 which operate in tandem on the track frame 18.

SEAL—FIG. 2

A roller seal comprises a pair of floatingly supported face seal members collectively indicated at 26 and received at one side in the recess of a coaxial cup 28 presented by the block 14, and received at the other side in an annular, axially extending recess formed in the coaxial hub 30 of the track roller 10. An elastomeric backup ring 32, shaped like a Belleville washer, is compressed between each seal member 26 of a pair and the receiving recess and floatingly supports that member of the pair so that the two seal members are held in concentric and coplanar, face sealing engagement.

Each track roller has a hollow interior 34, which is filled with lubricant externally through an axially inwardly directed, communicating lubricant passage 36, after a removable plug 38 in the outer end of the passage 36 is withdrawn.

To prevent shaft rotation, a locking pin 40 passes from an end of each block 14 transversely through the bore thereof and is lodged at the inner end in a socket in the shaft 12 in the bore.

ADJUSTMENT—FIG. 2

Each block 14 is rectangular and in its operative attitude is arranged with the opposite long faces or sides 42 of the block horizontal and flat on the surface. Compared to the horizontal midplane of the block which is halfway between the horizontal sides 42, the shaft receiving bore in the block is offcenter by an amount of eccentricity E, not shown, in the vertical direction with the result that, depending upon which way the block 14 is oriented with its ends in a horizontal plane, the upper one of the sides 42 will be relatively proximal or remote and the lower one of the sides 42 will be respectively remote or proximal to the bore. The one of the sides 42 which is uppermost engages the underside of an adjacent beam 16 and acts in compression to react the full load of the track roller directly into the beam.

Two inverted hold-down bolts 44 pass upwardly through bolt holes in the block 14 and are releasably secured in tapped bores in the bottom flange of that channel shaped beam 16 which is engaged by such block.

No shimming is necessary because, after the bolts 44 are removed, the re-assembler places the block selectively with the proximal side 42 at the top so that the roller 10 is in the high position as shown in FIG. 2 or with the remote side 42 at the top so that the roller and shaft are in the low positions 10a and 12a as shown in FIG. 3. The block is then reattached at the same point with the bolts 44.

TRACK FRAME—FIG. 1

The tractor 7 carries a set of transversely extending gauge bars, one of which is shown at 46 embraced by an attachment bracket 48 fixed to the track frame 18.

Located within the track frame are a drive sprocket 50 at the rear and a track front idler wheel 52 at the front, the sprocket and idler being spaced apart fore and aft by about the length of the tractor. A dead, transversely disposed idler shaft 54 is so supported by the idler fork 20 as to be fixed against rotation and the shaft 54 supports and defines the axis of rotation of the idler 52.

At the rear of the track frame, a live axle shaft 56 is rotatably mounted in the tractor for forward and reverse rotation and carries the sprocket 50 fast thereto at the outer end of the shaft so as to provide a fixed axis of rotation. The axes of rotation of all rollers 10 are always below the axis of rotation of each of the sprocket and front idler wheel.

Other rollers are provided in the frame 18, including track guide rollers, if desired, and also an upstanding, so-called upper idler 58 which is adjacent and above the recoil spring mechanism 24.

TRACK—FIG. 1

The spaced apart sprocket 50 and front idler 52 of each suspension mutually carry an endless metal track chain assembly 60 having loader shoes 62 and supported under tension with the upper flight 64 thereof trained across the top of the upper idler 58 and with the lower flight 66 thereof trained across the bottom of the track rollers 10. The sprocket 50 circulates the track assembly 60 for forward drive so as to take a clockwise direction as viewed in FIG. 1, and circulates the track assembly for rear drive so as to take a counterclockwise direction as viewed in FIG. 1.

RIDE

From the loader ride position as shown in FIGS. 1 and 2 in which each block 14 is in engagement at the top with its proximal side 42 beneath and against the adjacent frame beam 16, the track rollers of the suspensions 8 and 9 are adjusted into a lowered dozer position 10a for non-scuffing ride as shown in FIG. 3 wherein the remote side 42 of the repositioned block indicated by the solid lines 14a is at the top engaging the underside of the beam 16. Hence, dozer shoes 68 with deep grousers as at 70 can readily be employed. The change of elevation is indicated at 2E in FIGS. 2 and 3. The amount of the change from the offcenter bores equalling twice the eccentricity E of the bores of the block relative to the horizontal midplane of each block.

Hence, the lower flight of the track assembly 60 inclines upwardly and rearwardly from the No. 5 left and right track rollers 10 at an angle of inclination IR of a slight but appreciable amount into tangency with the sprocket. At the front, the lower chain flight 66 forwardly from the No. 1 roller 10 inclines at an angle IF upwardly into tangency with the front idler at a slight but appreciable amount.

Then when the radially prolongated, deep grousers 70 of track shoes 68 for dozer work strike the ground, particularly hard ground, they will not pound abruptly against the sprocket and front idler wheel and both mechanical wear and discomfort are reduced. The total lowering, due to the offcenter bores in the blocks, of the track rollers for dozer work can be comparatively small. Yet it has pronounced results in softening the ride and minimizing scuffing and wear of the grousers both at the front and at the rear during respective forward motion and reverse motion of the tractor.

When the adjustment is changed so that the proximal side of each block 10 is at the top against the underside of the beam, the portions of the lower flight of the track assembly 60 forwardly and rearwardly of the respective No. 1 and No. 5 left and right rollers 10 and the loader shoes 62 lie substantially flat on the ground, the corresponding values of the angles of inclination ZF and ZR at rear and front being reduced substantially to zero. In that adjustment, the front end of the tractor can readily carry a loader bucket, without allowing the front end of the tractor to pivot downwardly about the No. 1 left and right track rollers 10 so as to cause slight mechanical instability and an unsteady loader ride during loading work. At the same time, the sprocket 50 is also proportionally closer to the ground.

BLOCK MANUFACTURE

Because the blocks act in compression on their top, long side area to support the entire weight of the tractor, it is essential that the block, in an attitude for which it is specifically designed, have the long side which is to be at the top made precisely flat by a machining operation or equivalent operation such as being precision forged against a precisely flat surface of a forging die. The block will then solidly mate against the confronting flat underside of the adjacent beam.

At times during original equipment assembly and preferably consistently for stocking spare parts and replacement parts, the block 14 will have both of the long dimension sides made flat by machining or equivalent so as to seat precisely flush with the beam underside irrespective of the obverse or reverse mating attitude of the block thereunder. The dimension by which the block bore is offcenter to the top and bottom can be accurately controlled.

The tractor is steered by driving in conventional way, i.e., by appropriate friction engaged control over drive and pivot brake discs causing the drive sprocket 50 and track assembly 60 at each of the sides to run relative to one another at the same or at differing speeds, selectively in the forward and in the reverse direction.

Variations within the spirit and scope of the invention described are equally comprehended by the foregoing description.

What is claimed is:
1. In endless track structure having roller supporting means, and track rollers across the bottom of which a lower flight of the track is trained, said supporting means comprising a track frame, and roller shafts individual to the rollers:

the improvement in a set of shaft attachment blocks for the foregoing, which improvement comprises a one-piece block for attachment to the underside of the frame and bored to receive and support a roller shaft at one end, said block having flat, machined, load transferring, frame attachment surfaces at the respective top and bottom, and the block bore being offcenter with respect to the top and bottom to vertically shift the plane of the bottoms of the track rollers when blocks in the set are collectively inverted, said block carrying one roller shaft seal portion, which one portion is engageable with another roller shaft seal portion carried by the roller at said one end of the shaft and which when engaged therewith forms a seal blocking off the shaft from the outside.

References Cited

UNITED STATES PATENTS

| | | | |
|---|---|---|---|
| 2,511,098 | 6/1950 | Bridwell | 305—30 |
| 2,690,933 | 10/1954 | Bechman | 305—14 X |
| 2,834,639 | 5/1958 | Herr | 305—28 X |
| 3,156,505 | 11/1964 | Habert | 305—30 |
| 3,382,013 | 5/1968 | Toth | 308—18 |

RICHARD J. JOHNSON, Primary Examiner

U.S. Cl. X.R.

305—27; 308—18